(12) United States Patent
Ka et al.

(10) Patent No.: US 7,693,901 B2
(45) Date of Patent: Apr. 6, 2010

(54) CONSUMER-FOCUSED RESULTS ORDERING

(75) Inventors: Chong I. Ka, Redmond, WA (US); Helen Jean Cuncannan, Seattle, WA (US); Kong-Kat Wong, Seattle, WA (US); Mackenzie Steele, Bellevue, WA (US); Michael P. Gordon, Redmond, WA (US); Shailesh Prakash, Redmond, WA (US); Thomas F. Bergstraesser, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 473 days.

(21) Appl. No.: 11/200,615

(22) Filed: Aug. 10, 2005

(65) Prior Publication Data

US 2007/0038620 A1     Feb. 15, 2007

(51) Int. Cl.
*G06F 7/00* (2006.01)
(52) U.S. Cl. .................. 707/723; 707/727; 707/728
(58) Field of Classification Search ............... 707/3, 707/5
See application file for complete search history.

(56) References Cited

U.S. PATENT DOCUMENTS

| | | | |
|---|---|---|---|
| 5,659,732 A * | 8/1997 | Kirsch | 707/5 |
| 6,418,433 B1 * | 7/2002 | Chakrabarti et al. | 707/5 |
| 6,640,218 B1 * | 10/2003 | Golding et al. | 707/2 |
| 6,704,722 B2 * | 3/2004 | Wang Baldonado | 707/3 |
| 6,785,671 B1 * | 8/2004 | Bailey et al. | 707/3 |
| 6,963,867 B2 * | 11/2005 | Ford et al. | 707/3 |
| 7,072,902 B2 * | 7/2006 | Kleinberger et al. | 707/102 |
| 7,447,678 B2 * | 11/2008 | Taylor et al. | 707/3 |
| 2005/0004889 A1 * | 1/2005 | Bailey et al. | 707/1 |
| 2005/0050014 A1 * | 3/2005 | Gosse et al. | 707/3 |
| 2005/0108210 A1 * | 5/2005 | Wang et al. | 707/3 |
| 2005/0289140 A1 * | 12/2005 | Ford et al. | 707/5 |
| 2006/0106769 A1 * | 5/2006 | Gibbs | 707/3 |
| 2006/0167864 A1 * | 7/2006 | Bailey et al. | 707/3 |

* cited by examiner

*Primary Examiner*—John E Breene
*Assistant Examiner*—Joshua Bullock
(74) *Attorney, Agent, or Firm*—Shook Hardy & Bacon LLP (57) ABSTRACT

A vertical search engine may rank items based on both the quality of data associated with each item and the popularity of each item. The vertical search engine may access data associated with items from a variety of different sources, including feed sources and crawl sources. Data quality inputs are determined for each item based on the quality of the data associated with each respective item. In addition, popularity inputs are determined for each item based on user interest in each respective item. A global rankings score is then calculated for each item based on the data quality inputs and popularity inputs for each respective item. The global ranking score may be used to order search results for search queries in such a way that items from feed data and items from crawl data may be displayed in a unified manner, rather than being segregated by data source.

17 Claims, 6 Drawing Sheets

CONSUMER-FOCUSED RESULTS ORDERING

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND

A search engine is a program designed to find information stored on one or more computing devices. In its most recognized format, search engines, such as those employed by MSN, Yahoo, and Google, for example, are used to find websites and documents throughout the Internet. These types of search engines typically perform "horizontal" searches, providing a breadth of information related to the search query. However, users often desire information within a narrow topic or field. Accordingly, vertical search engines have been designed to perform specialized searches to mine data for a narrow niche. For example, a shopping vertical search engine may be employed to search information for products users may wish to purchase. Other types of vertical search engines include job/career verticals, travel verticals, local services verticals, research verticals, real estates verticals, automobile verticals, and news verticals, for example.

Typically, vertical search engines maintain a database containing information relating to the particular topic of the vertical. In addition, the information is typically fed to the search engine by a number of feed sources. When the vertical search engine receives search queries, it may access the database to generate search results for the query. For example, a shopping vertical search engine may include a database storing product information and offers that are fed to the search engine by a number of different sources, such as merchants and retailers. When the shopping vertical search engine receives search queries, it accesses the database and provides a listing of products with associated product information and offers based on the query.

A drawback to having only feed data available to vertical search engines is that search results provide only limited information to users. A large amount of information relating to the particular topic of the vertical may be missing. To capture more information, web crawl information may also be added to the database. For example, a shopping vertical search engine may crawl retailer websites to capture information regarding products being sold by the retailer. However, information gathered by such a web crawl may be less complete and less reliable than information fed to the search engine. In addition, it is difficult to commingle and order items from both feed sources and crawl sources such that items users are most likely to be interested in are provided first. For example, if items were ordered based on the reliability and completeness of information associated with each item, items from feed sources would typically be listed first and crawl sources would been hidden at the end of the search results, even though users may be interested in items from crawl sources.

BRIEF SUMMARY

Embodiments of the present invention relate to ranking items for a vertical search engine. The vertical search engine may access item data from both feed sources and crawl sources. Based on the accessed item data, the vertical search engine may determine data quality inputs, which represent the quality of data associated with each item. In addition, the vertical search engine may determine popularity inputs, which represent users' interest in each item. Using the data quality inputs and popularity inputs, the search engine calculates a global ranking score for each item. The score may be calculated in a consistent manner for item data from feed sources and from crawl sources. Accordingly, when the search engine receives a search query, it may provide search results based on the query, including a list of items ordered based on the global ranking score for each item, regardless of the source of the item data.

BRIEF DESCRIPTION OF THE SEVERAL VIEWS OF THE DRAWING

The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Overview

Embodiments of the present invention provide a consumer-centric ranking of items on a vertical search engine based on both user interest in items and the quality of data available to the vertical search engine for each of the items. User interest or the popularity of items may be based on a variety of different inputs. By way of example only and not limitation, item popularity inputs may include user clicks on items, ratings and reviews for items, and transactional data (e.g., product purchases for a shopping vertical). The quality of data for items may be determined based on a variety of inputs relating to the completeness and accuracy of data available for each item.

It should be noted that the present invention may be applied to any type of vertical search. By way of example only and not limitation, such vertical searches include shopping verticals, job/career verticals, travel verticals, local services verticals, research verticals, real estate verticals, automobile verticals, and news verticals. Accordingly, as used herein, the term "item" refers broadly to any type of item that may be included as a search result within any type of vertical.

The ranking permits, among other things, items from a variety of different sources with varying levels of data quality to be commingled and ranked. In particular, item data may be accessed by the vertical search engine in at least two ways. First, item data may be provided to the vertical search engine by a number of feed sources. Second, the vertical search engine may crawl websites, documents, and the like to obtain item data from other sources that do not specifically provide data to the vertical search engine (i.e. crawl sources).

The ranking of items in accordance with embodiments of the present invention may be employed with any type of search, such as keyword searches or browse searches, for example. Further, the ranking may serve as either a primary or secondary means for sorting items for a search. For an example of primary sorting, when a user performs a browse search and selects a particular category, the ranking may be used for primary sorting such that the items within that category are presented based on the ranking order. For secondary sorting, the ranking may serve as a tiebreaker for items. For example, a keyword search may primarily sort items based on relevancy to the keyword. Items with similar relevancy then may be secondarily sorted using the ranking. As another example, products for a shopping vertical search engine may be primarily sorted based on pricing. Items with similar pricing may then be secondarily sorted using ranking in accordance with embodiments of the present invention.

Accordingly, in one aspect, an embodiment of the present invention is directed to a method for ranking a plurality of items. The method includes accessing data associated with a number of items from a number of data sources. The data sources include at least one feed source and at least one crawl source. The method also includes determining at least one popularity input for each item and determining at least one data quality input for each item. The method further includes calculating a global ranking score for each item based on the at least one popularity input and the at least one data quality input for each respective item.

In another aspect, an embodiment of the present invention relates to a method for providing search results based on a search query from a client device. The method includes receiving the search query from the client device. The method also includes determining a subset of items based on the search query. Each of the items has a global ranking score that is based on at least one popularity input and at least one data quality input for each respective item. The method further includes providing the subset of items to the client device, wherein the items are ordered based at least in part on the global ranking score associated with each item.

In a further aspect of the invention, an embodiment is directed to a search engine for ranking items. The search engine includes a data accessing component and a ranking component. The data accessing component is capable of accessing data associated with a number of items from a number of sources, which include at least one feed source and at least one crawl source. The ranking component is capable of calculating a global ranking score for each of the items based on at least one data quality input and at least one popularity input for each respective item.

Exemplary Operating Environment

Having briefly described an overview of the present invention, an exemplary operating environment for the present invention is described below.

Figure 1:
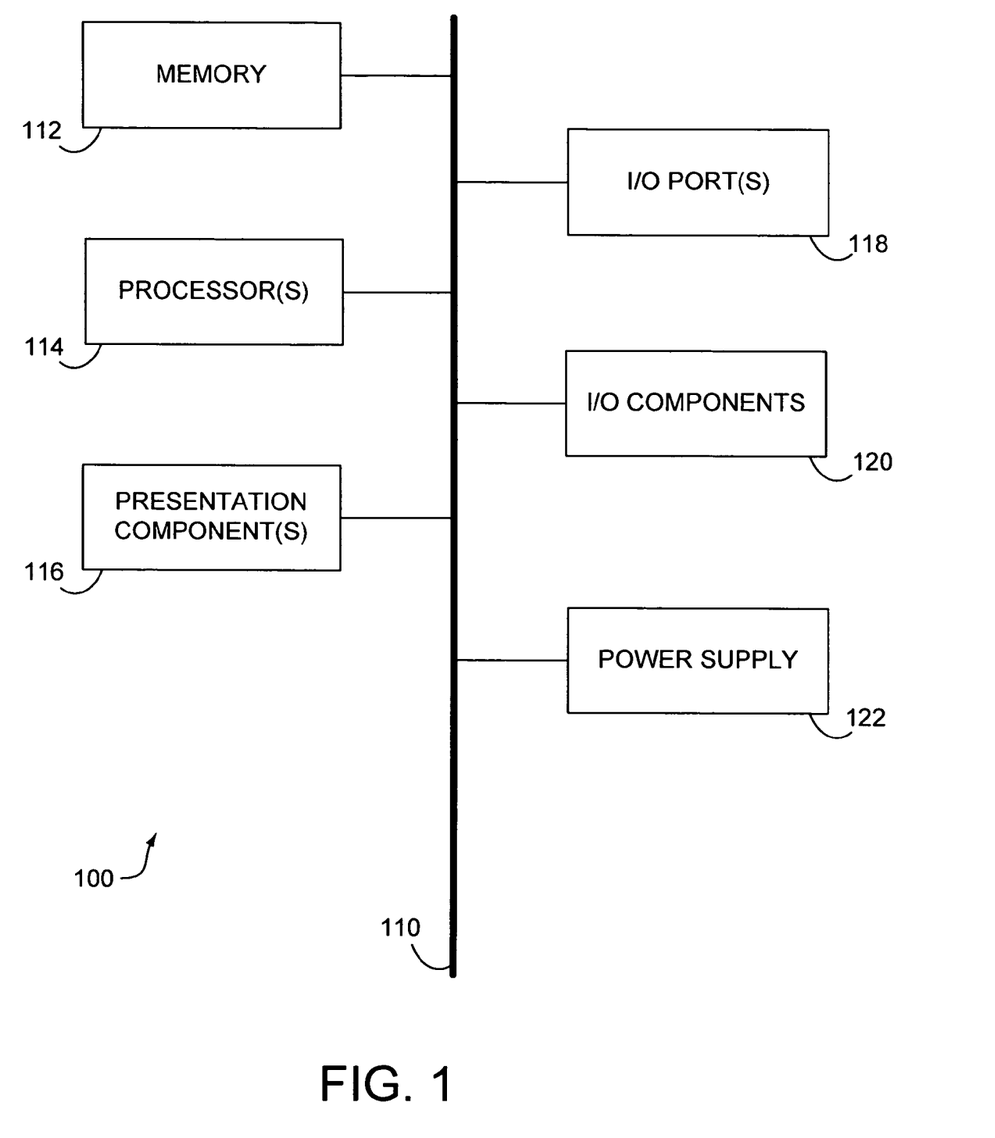
FIG. 1 is a block diagram of an exemplary computing environment suitable for use in implementing the present invention.

Referring to the drawings in general and initially to FIG. 1 in particular, an exemplary operating environment for implementing embodiments of the present invention is shown and designated generally as computing device 100. computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

Computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. We recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. By way of example, and not limitation, computer-readable media may comprises Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, or any other storge medium that can be used to encode and store desired information and be accessed by computing device 100.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O port(s) 118 allow computing device 100 to be logically coupled to other devices including I/O components 120, some of which may be built in. Illustrative components include a microphone, joystick, game pad, satellite dish, scanner, printer, wireless device, etc.

Exemplary System

Figure 2:
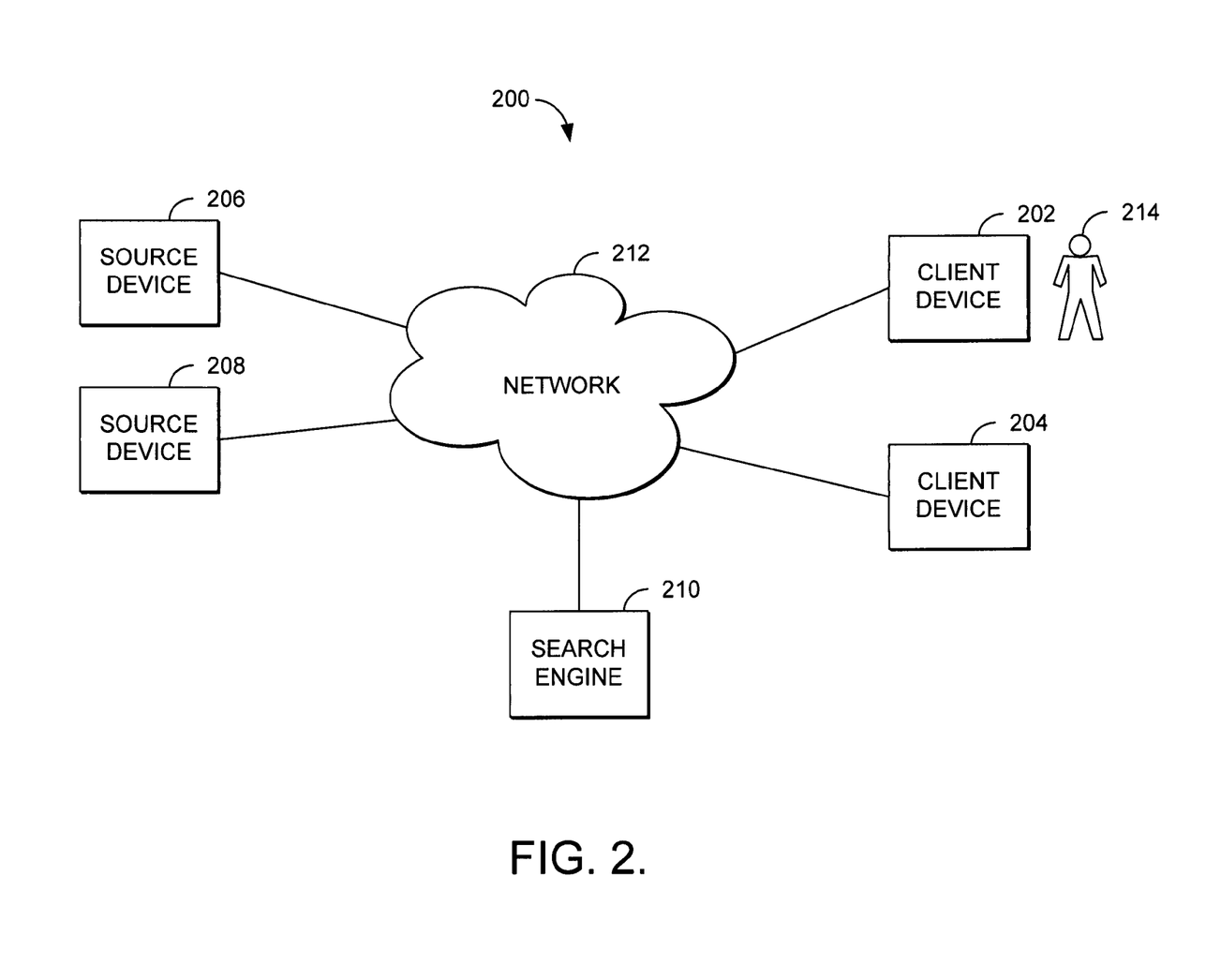
FIG. 2 is a block diagram of an exemplary system in which embodiments of the present invention may be employed.

Referring now to FIG. 2, a block diagram is provided illustrating an exemplary system 200 in which embodiments of the present invention may be employed. Among other components hot shown, the system 200 may include multiple client devices, such as client devices 202, 204, multiple source devices, such as source devices 206, 208, and a search engine 210. Each of the client devices, source devices, and search engine may be any type of computing device, such as computing device 100 described with reference to FIG. 1, for example. The components may communicate with each other via a network 212, which may include, without limitation, one or more local area networks (LANs) and/or wide area networks (WANs). Such networking environments are commonplace in offices, enterprise-wide computer networks, intranets, and the Internet. It should be understood that any number of client devices, source devices, search engines, and networks may be employed within system 200 within the scope of the present invention.

Source devices, such as the source devices 206, 208, may maintain a variety of data for different items. For example, in the context of shopping, a source device may be a server for a consumer electronics retailer. The server may contain data regarding products offered by the retailer, such as televisions and computers, for example. Each source device may function as either a feed source or a crawl source (although some source devices may serve as both a feed source and crawl source). Feed source devices provide specific item data to the search engine 210. For example, in the context of the previous consumer electronics retailer scenario, the server may provide an XML feed that contains distinct attributes of items offered by the retailer. In contrast, crawl source devices do not provide such feeds but merely maintain item data. The search engine may access the data by crawling these source devices. For example, referring to the previous consumer electronics scenario again, such a source device may be a server that maintains a website for the consumer electronics retailer. Data relating to consumer electronics offered by the retailer may be accessed by crawling the website.

Figure 3:
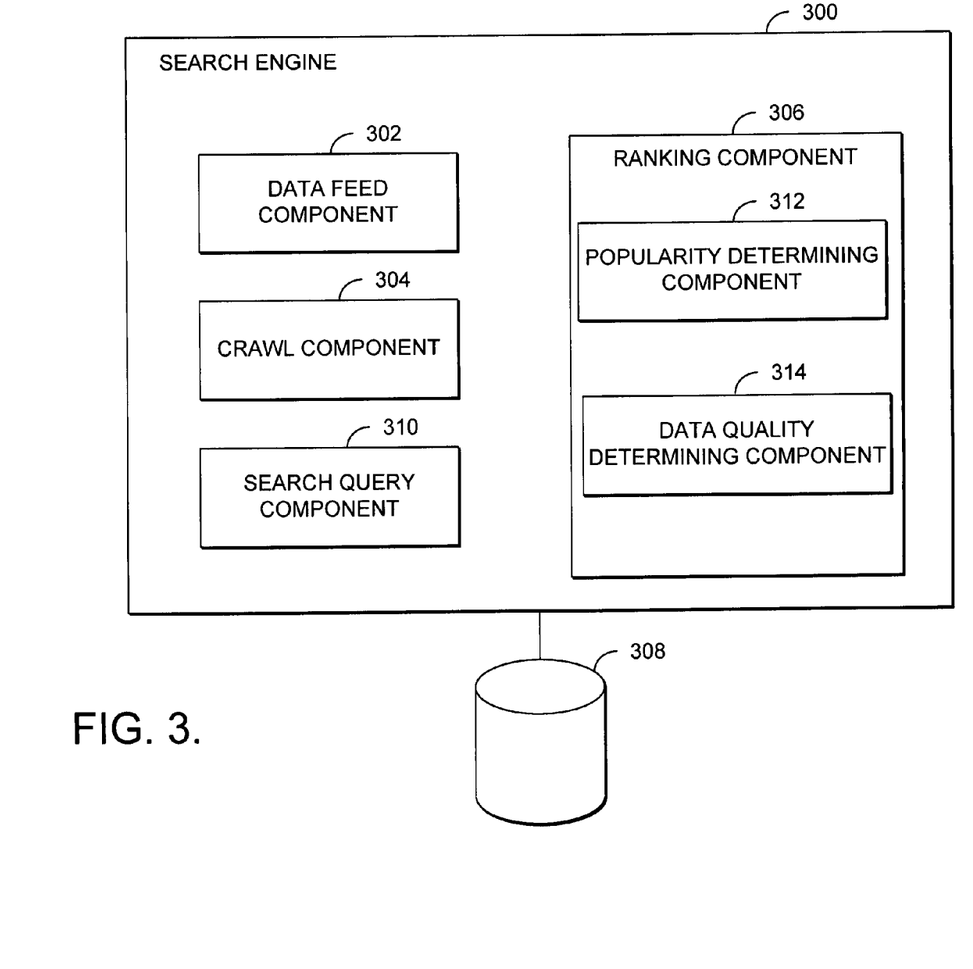
FIG. 3 is a block diagram of an exemplary search engine in accordance with an embodiment of the present invention.

The search engine 210 accesses data associated with items from the multitude of source devices, such as source devices 202, 204, and determines a global ranking score for each of the items. The global ranking score may be used to sort items when users access the search engine 210 to search for particular items. Referring to FIG. 3, an exemplary search engine 300 in accordance with an embodiment of the present invention will be described in further detail. Among other components not shown, the search engine may include a data feed component 302, a crawl component 304, a ranking component 306, a database 308, and a search query component 310.

The data feed component 302 may access data associated with items from feed sources that provide such data. It should be understood that the term "feed" should not imply that data must be pushed from a feed source device to the search engine 300. Instead, the data feed component 302 may access data from feed source devices via either a push or pull relationship. The crawl component 304 may crawl documents, websites, and the like contained on source devices to access data regarding items included on the devices. Data accessed by both the data feed component 302 and the crawl component 304 may be stored in the database 308.

The ranking component 306 allows the search engine to determine a global ranking score for items. The global ranking score for an item may be based on both the popularity of the item and the quality of data associated with the item. Accordingly, the ranking component 306 may include a popularity determining component 312 and a data quality determining component 314.

The popularity determining component 312 determines the popularity of an item based on popularity information gathered for the item. As users access items from the search engine 300, the popularity component 312 may gather data regarding users' interest in items and store the popularity data for each item in the database 308. Popularity data may include, for example, the number of raw user clicks on items, information relating to user ratings and reviews, and transactional data (e.g., product purchases on a shopping vertical). One skilled in the art will recognize that a variety of other popularity data may be gathered and used within the ranking process within the scope of the present invention.

The data quality determining component 314 determines the quality of the data associated with each item. A wide variety of data quality inputs may be used in this determination. By way of example only and not limitation, data quality inputs may include the precision and quality of the classification of an item, the completeness and quality of attributes for an item that are included in the data, the confidence in processing of data for an item, and the confidence of the source of data for an item. One skilled in the art will recognize that a wide variety of other data quality inputs may be employed within the scope of the present invention.

Using the popularity inputs from the popularity determining component 312 and the data quality inputs from the data quality determining component 314, the ranking component 306 calculates a global ranking score for each of the items. The global ranking score may be associated with each item and stored in the database 308.

The search engine 300 may receive search queries from client devices, such as the client devices 202, 204 of FIG. 2, via a search query component 310. A search query may be initiated by a user, such as user 214 associated with client device 202 of FIG. 2. Alternatively, a search query may be automatically generated by a client device. In response to a search query, the search engine 300 provides search results to the requesting client device. The search results comprise a subset of items corresponding to the search query. In addition, the items are ordered using the global ranking score determined for each of the items by the ranking component 306.

Exemplary Method

Figure 4:
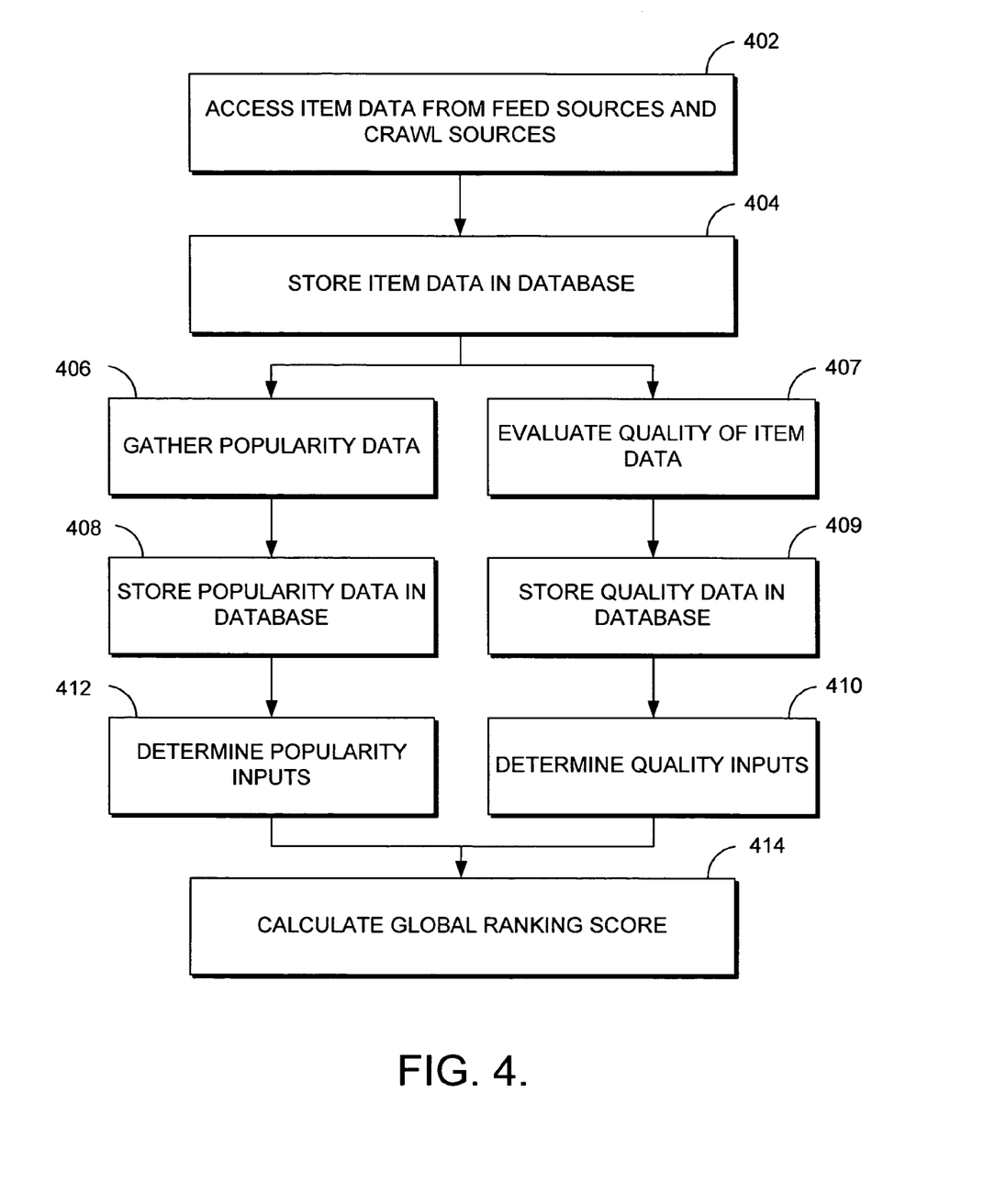
FIG. 4 is a flow diagram showing a method for calculating global raking scores for items in accordance with an embodiment of the present invention.

FIG. 4 is a flow diagram illustrating a method 400 for determining global ranking scores for items in accordance with an embodiment of the present invention. Initially, a search engine (such as the search engine 210 of FIG. 2) accesses data for items from a multitude of different sources, as shown at block 402. As discussed previously, the search engine accesses data by both obtaining data feeds from feed sources and obtaining data by crawling sources. The item data is then stored in a database associated with the search engine (such as the database 308 of FIG. 3), as shown at block 404. The item data accessed from the various sources may include data for new items, as well as data for items already existing in the database. The new items and associated data are added to the database, while data associated with existing items is used to update the existing item data. The item data may be evaluated for quality, as shown at block 407, and the results of the evaluation may be stored in the database, as shown at block 409.

In addition to item data, the search engine also gathers popularity data for items included in the database, as shown at block 406. The popularity data may include any type of information relating to user interest in each of the items. By way of example only and not limitation, the popularity data may include user clicks on items, ratings and reviews of items, and transactional data for items (such as product purchases for shopping verticals). The popularity data may also be stored in the database, as shown at block 408.

Based on the item data and popularity data, data quality inputs and popularity inputs for calculating the global ranking score for each item may be determined. Accordingly, at block 410, the search engine determines data quality inputs for the global ranking score. The data quality inputs relate to the reliability of and confidence in the data associated with each item. For example, a data quality input may be based on the extent of data available for a given item. Another data quality input may be based on the reliability of the source of data for an item. One skilled in the art will recognize that a wide variety of other data quality inputs may be determined. In addition to the data quality inputs, the search engine determines popularity inputs for the global ranking score, as shown at block 412. The popularity inputs are based on the popularity data gathered for each item Using the data quality inputs and the popularity inputs, the search engine calculates a global ranking score for each of the items within the database, as shown at block 414. It should be noted that in some embodiments, an initial default global ranking score may be assigned to new items that have not had an opportunity to garner clicks, ratings and reviews, and the like. The default score may be assigned to items for a predetermined period of time and replaced by a calculated global ranking score (as described above) after the predetermined period of time expires. Because popularity forms a portion of the global ranking score, this prevents new items from being buried at the bottom of results and thus gives the new items a grace period at the default value in order to have a fair chance to garner popularity data.

Exemplary Operation

Having described general embodiments of the present invention, the invention will now be further described with reference to an exemplary operation in the context of ranking products for a shopping vertical search engine. Although a shopping vertical search engine is described herein, as previously noted, it should be understood that the present invention applies equally to ranking results for any type of vertical search engine.

In accordance with an embodiment of the present invention, the global ranking score for products on a shopping vertical search engine may be calculated from a number of source scores that quantify the various popularity and data quality inputs. A predetermined weighting may be applied to each source score to represent its role within the global ranking score. Accordingly, the predetermined weighting applied to each source score determines the contribution of the various inputs to the global ranking score. Each source score may also be comprised of multiple subcomponents. Each subcomponent may be weighted (using a predetermined weighting) within the source score to represent that subcomponent's percentage of the source score. After source scores have been calculated, each source score is multiplied by its predetermined weighting, and all the weighted scores are then added together to create the global ranking score. Accordingly, a general formula for calculating the global ranking score may be represented as follows:

$$\text{Global Ranking Score} = (\text{Source Score}_1 * \text{Source Score}_1 \text{ Weighting}) + (\text{Source Score}_2 * \text{Source Score}_2 \text{ Weighting}) \ldots + (\text{Source Score}_N * \text{Source Score}_N \text{ Weighting})$$

Figure 5:
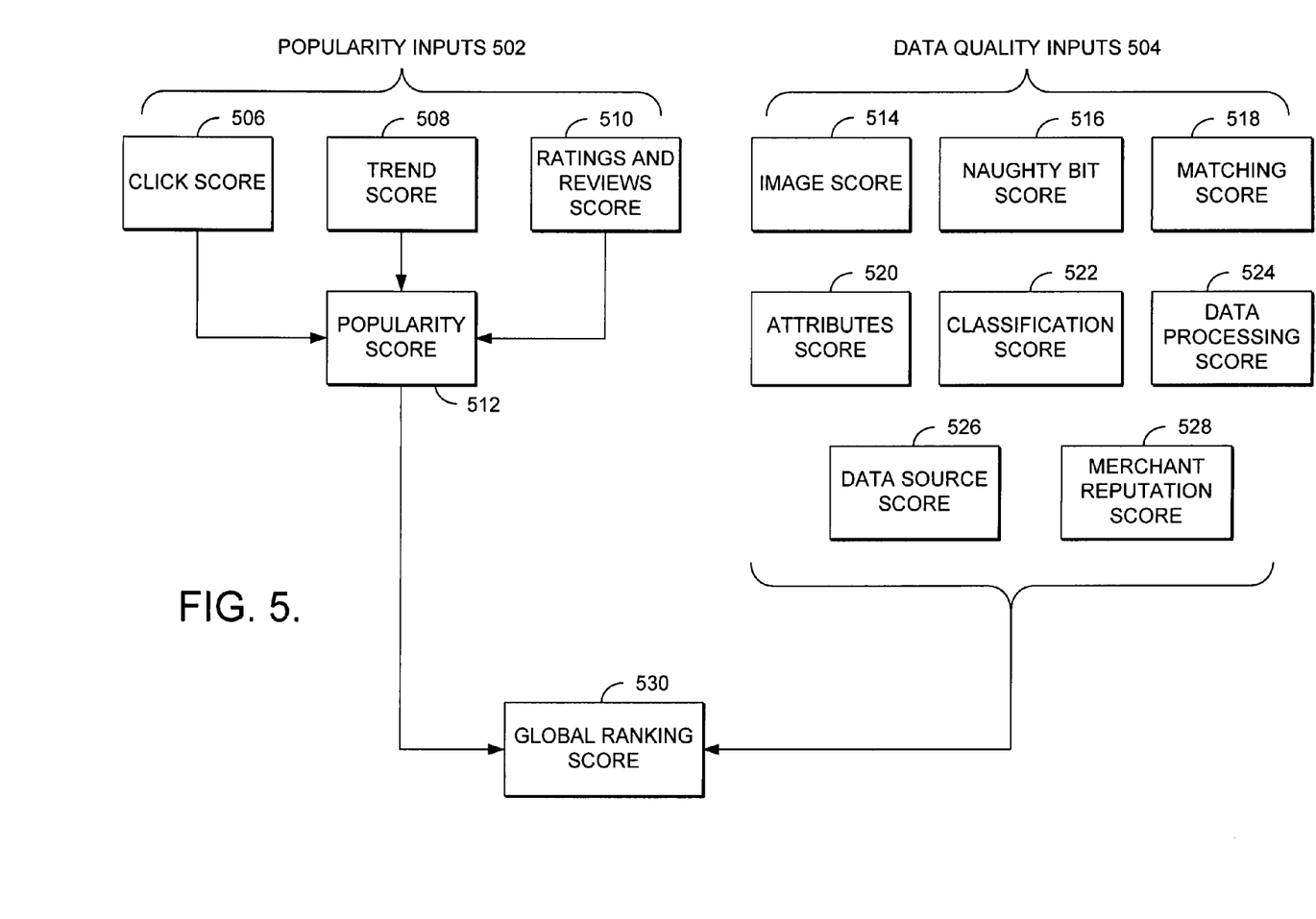
FIG. 5 is a block diagram showing exemplary inputs for calculating global ranking scores for products within a shopping vertical search engine in accordance with an embodiment of the present invention.

Referring to FIG. 5, the various inputs or source scores that may be used to generate a global ranking score for a product within a shopping vertical search engine is illustrated. It should be understood that the inputs shown in FIG. 5 are exemplary in nature, and the global ranking score for a product may be calculated using only a portion of the inputs shown. In addition, inputs not shown in FIG. 5 may be included in the calculation of the global ranking score. Generally, the inputs may be classified as either popularity inputs 502 or data quality inputs 504. The popularity inputs 502 include a click score 506, a trend score 508, and a ratings and reviews score 510. Each of these subcomponent scores may be combined to form a popularity score 512. The data quality inputs include an image score 514, a naughty bit score 516, a matching score 518, an attributes score 520, a classification score 522, a data processing score 524, a data source score 526, and a merchant reputation score 528. Based on these inputs or source scores, the global ranking score 530 may be calculated as follows:

$$\text{Global Ranking Score} = (\text{Popularity Score} * \text{Popularity Weighting}) + (\text{Quality Score} * \text{Quality Weighting})$$

$$\text{where Popularity Score} = (\text{Click Score} * \text{Click Weighting}) + (\text{Trend Score} * \text{Trend Weighting}) + (\text{Ratings \& Reviews Score} * \text{Ratings\&Reviews Weighting})$$

$$\begin{aligned}\text{and where Quality Score} = &(\text{Image Score} * \text{Image Weighting}) \\&+ (\text{Naughty Bit Score} * \text{Naughty Bit Weighting}) \\&+ (\text{Matching Score} * \text{Matching Weighting}) \\&+ (\text{Attributes Score} * \text{Attributes Weighting}) \\&+ (\text{Classification Score} * \text{Classification Weighting}) \\&+ (\text{Data Processing Score} * \text{Data Processing Weighting}) \\&+ (\text{Data Source Score} * \text{Data Source Reputation}) \\&+ (\text{Merchant Rep. Score} * \text{Merchant Rep. Weighting})\end{aligned}$$

Each of the source scores indicated above for calculating a global ranking score for a product will now be described in further detail.

Click Score

The click score represents the raw user clicks that a product receives, indicating user interest in that product. Any variety of clicks on a product may be included in the click score. By way of example only and not limitation, the clicks may include a click on a product image, a click to product details, a click on an offer for the product, and a click on a merchant offering the product. Typically, only clicks occurring during a predetermined period of time (e.g., the past 15 days) are included in the click score.

Because products that are provided first in search results are more likely to receive clicks, in some embodiments, weighting may be applied to clicks on products appearing later in a search result. For example, clicks on products appearing on the third page of results and beyond may be weighted more heavily than clicks on products appearing on the first two pages. This approach prevents a self-fulfilling prophecy, in which highly ranked products artificially retain their high ranking merely because the products appear first in search results, thereby continuing to garner more clicks.

Because products that are highlighted in various types of merchandising or manual content are more likely to receive clicks, in some embodiments, click data may be restricted to include only clicks received in certain contexts or on certain page types (e.g., in search results, but not on a home page, category page or article page).

The calculation of a click score may be summarized as follows. Initially, the totals click over a predetermined period of time are accumulated for products. As discussed previously, the total clicks may include weighting applied to clicks on products appearing later in query results. Non-integer results from any such weighting may be rounded to the nearest integer. Table 1 illustrates the total clicks tallied for a number of products.

TABLE 1

Total Clicks

| Total Clicks | Product ID |
|---|---|
| 87 | A |
| 18 | B |
| 4 | C |
| 0 | D |
| 0 | E |
| 3,459 | F |
| 243 | G |
| 18 | H |
| 43 | I |
| 20 | J |
| 109 | K |
| 36 | L |
| 10 | M |

The click tallies are next sorted in ascending order (low to high) and each product is assigned a rank in this ascending order, as shown in Table 2. The ranks are also assigned in ascending order from 0 to any given number. Products that have received no clicks are assigned a rank of 0. Products that have received the same number of clicks are assigned a tied number. By ranking the items instead of calculating a percentage for each item, for example, the high popularity of some products as compared to the moderate popularity of other products is smoothed out.

TABLE 2

Ordering and Ranking based on Total Clicks

| Total Clicks | Product ID | Rank |
|---|---|---|
| 0 | D | 0 |
| 0 | E | 0 |
| 4 | C | 1 |
| 10 | M | 2 |
| 18 | B | 3 |
| 18 | H | 3 |
| 20 | J | 4 |
| 36 | L | 5 |
| 43 | I | 6 |
| 87 | A | 7 |
| 109 | K | 8 |
| 243 | G | 9 |
| 3,459 | F | 10 |

After ranking the products, a click score and weighted click score are calculated for each product, as shown in Table 3. To calculate the click score, the maximum click rank assigned is first determined (i.e. "max(click rank)"). The click score is then calculated by dividing the click rank for each product by the maximum click rank as shown in the following equation.

Click Score=Click Rank/max(click rank)

The click score is then multiplied by a predetermined click score weighting to calculate the weighted click score that will be used in the popularity score calculation as represented by the equation below. Finally, the click rank, click score, and weighted click score for each item are stored in the database.

Weighted Click Score=Click Score*Click Weighting

TABLE 3

Click Score and Weighted Click Score

| Total Clicks | Product ID | Click Rank | Click Score | Weighted Click Score |
|---|---|---|---|---|
| 0 | D | 0 | 0 | 0 |
| 0 | E | 0 | 0 | 0 |
| 4 | C | 1 | .100 | 80 |
| 10 | M | 2 | .200 | 160 |
| 18 | B | 3 | .300 | 240 |
| 18 | H | 3 | .300 | 240 |
| 20 | J | 4 | .400 | 320 |
| 36 | L | 5 | .500 | 400 |
| 43 | I | 6 | .600 | 480 |
| 87 | A | 7 | .700 | 560 |
| 109 | K | 8 | .800 | 640 |
| 243 | G | 9 | .900 | 720 |
| 3,459 | F | 10 | 1.000 | 800 |

Trend Score

The trend score represents the trend in clicks that a product is receiving. For example, if a product is increasing in popularity as determined by an increase in clicks, the product receives emphasis through the trend score. In contrast, if a product is decreasing in popularity as determined by a decrease in clicks, the product is deemphasized. Thus, the trend score may be used to give seasonal, new, or highly popular items a better representation.

In one embodiment, a linear regression least square algorithm is used to determine the slope of the trend in an item's clicks over a trend period (i.e. the period of time for which a trend is being calculated). Initially, the raw click counts for the trend period are retrieved. For example, if trend is being based on the past ten days, raw click counts for products for the past ten days are retrieved. A trend slope is next determined by calculating slope as shown in the following equation.

$$\text{Trend Slope} = \frac{n*\sum xy - \sum x \sum y}{n*\sum x^2 - (\sum x)^2}$$

where n represents the number of trend days (e.g. 10 days), x represents the ordinal number of each of the individual trend days (1, 2, 3, 4, 5, 6, 7, 8, 9, 10), and y represents the number of qualifying popularity clicks.

A trend rank, trend score, and weighted trend score are next calculated similar to the calculation of the click rank, click score, and weighted click score, as shown in Table 4 and the following equations. Accordingly, products are first ranked according to their trend slope scores. Trend scores are then calculated by dividing each trend rank by the maximum trend rank. A predetermined weighting may then be applied to the trend scores to calculate weighted trend scores. In some embodiments, if a trend slope is less than one (i.e. indicating decreasing popularity), the product is given a trend rank of zero. In other embodiments, if a trend slope is less than one, the product may be penalized (e.g., by giving it a negative ranking and negative trend score). Finally, the trend score and weighted trend score for each product may be stored in the database.

Trend Score=Trend Rank/max (trend rank)

Weighted Trend Score=Trend Score*Trend Weighting

TABLE 4

Trend Rank, Trend Score, and Weighted Trend Score

| Trend Slope | Product ID | Trend Rank | Trend Score | Weighted Trend Score |
|---|---|---|---|---|
| 0 | D | 0 | 0 | 0 |
| 0 | E | 0 | 0 | 0 |
| .73 | C | 0 | 0 | 0 |
| .89 | M | 0 | 0 | 0 |
| .99 | B | 0 | 0 | 0 |
| 1.56 | H | 1 | .125 | 25 |
| 1.75 | J | 2 | .250 | 50 |
| 2.01 | L | 3 | .375 | 75 |
| 2.03 | I | 4 | .500 | 100 |
| 2.12 | A | 5 | .625 | 125 |
| 3.92 | K | 6 | .750 | 150 |
| 5.00 | G | 7 | .875 | 175 |
| 10.17 | F | 8 | 1 | 200 |

Ratings and Reviews Score

The ratings and reviews score represents the popularity of products based on user ratings and reviews of the products. The ratings and reviews score is calculated using the count of ratings and reviews available for each item on the day that the score is being calculated. As with the click score and trend score, a ranking approach may be used to normalize relativity between items, and smooth out the few high ratings and reviews counts that can disrupt a set. In the case of ratings and reviews, a ranking approach also partially mitigates the impact of reviews or ratings spoofing. In the embodiment further described below, the ratings and reviews score takes into account only ratings and reviews for products meeting a certain threshold (e.g., an average rating of three out of five). In other embodiments, however, the ratings and reviews score may account for other factors, such as providing a negative score to products with poor ratings and reviews, for example.

In one embodiment, the ratings and reviews score may be calculated by first accumulating the total number of ratings and reviews that currently exist for a product, as shown in Table 5. To tally the total ratings and reviews, the total number of ratings may be multiplied by a predetermined ratings weighting, and the total number of reviews may be multiplied by a predetermined reviews weighting. As mentioned previously, in this embodiment, only counts from products having a minimum predetermined rating are used.

TABLE 5

Total Ratings and Reviews

| Total Ratings and Reviews | Product ID |
|---|---|
| 87 | A |
| 18 | B |
| 4 | C |
| 0 | D |
| 0 | E |
| 3,459 | F |
| 243 | G |
| 18 | H |
| 43 | I |

TABLE 5-continued

Total Ratings and Reviews

| Total Ratings and Reviews | Product ID |
|---|---|
| 20 | J |
| 109 | K |
| 36 | L |
| 10 | M |

Products are then placed in ascending order based on the ratings and reviews tallies and given a rank, as shown in Table 6. Products having no ratings or reviews are given a rank of zero.

TABLE 6

Ratings and Reviews Rank

| Total Ratings and Reviews | Product ID | Rank |
|---|---|---|
| 0 | D | 0 |
| 0 | E | 0 |
| 4 | C | 1 |
| 10 | M | 2 |
| 18 | B | 3 |
| 18 | H | 3 |
| 20 | J | 4 |
| 36 | L | 5 |
| 43 | I | 6 |
| 87 | A | 7 |
| 109 | K | 8 |
| 243 | G | 9 |
| 3,459 | F | 10 |

A ratings and review score, and weighted ratings and review score are next calculated, as shown in Table 7 and the following equations. Ratings and reviews scores are calculated by dividing the ratings and reviews rank for each product by the maximum ratings and reviews rank. A predetermined weighting may then be applied to the ratings and reviews scores to calculate weighted ratings and reviews scores. The ratings and reviews rank, score, and weighted score for each product may then be saved in the database.

R&R score=R&R Rank/max(R&R rank)

Weighted R&R Score=R&R Score*R&R Weighting

TABLE 7

Ratings and Reviews Score and Weighted Ratings and Reviews Score

| Total # of R&R | Product ID | R&R Rank | R&R Score | Weighted R&R Score |
|---|---|---|---|---|
| 0 | D | 0 | 0 | 0 |
| 0 | E | 0 | 0 | 0 |
| 4 | C | 1 | .100 | 80 |
| 10 | M | 2 | .200 | 160 |
| 18 | B | 3 | .300 | 240 |
| 18 | H | 3 | .300 | 240 |
| 20 | J | 4 | .400 | 320 |
| 36 | L | 5 | .500 | 400 |
| 43 | I | 6 | .600 | 480 |
| 87 | A | 7 | .700 | 560 |
| 109 | K | 8 | .800 | 640 |
| 243 | G | 9 | .900 | 720 |
| 3,459 | F | 10 | 1.000 | 800 |

In some embodiments, users may be able to rate the helpfulness of product reviews. In such an embodiment, the ratings and reviews score may further be weighted by a factor representing the aggregate helpfulness rating for reviews associated with an item.

Popularity Score

The popularity score for a product represents the popularity of or user interest in the product. As previously noted, the popularity score may include a variety of inputs, such as a click score, trend score, and a reviews and ratings score. Accordingly, the popularity score may be calculated as follows:

Popularity Score=(Click Score*Click Weighting) + (Trend Score*Trend Weighting) +(Ratings and Reviews Score*Ratings and Review Weighting)

Image Score

An image score may be used to reflect the presence or absence of an image associated with a product, as well as the quality of an image. Whether a product references a unique image or an image that is referenced by other products within a set may also be factored in the image score. For example, products which reference images that occur more than once in a data set may get a smaller score than products having a specific image. However, because it is possible that an image can be legitimately reused (i.e. for two or more separate SKUs of a single model), a predetermined number may be set as a threshold for reducing an image score.

Accordingly, in one embodiment, an image score value is selected. If a product has a image that is determined to be a unique image, the product receives 100% of the image score value. If a product has an image but the image is determined to be a repeated image (e.g., repeated for more than a predetermined number of products), the product receives a smaller percentage of the image score value. Finally, if a product does not have an image associated with it, the product will not receive any of the image score value.

Naughty Bit Score

Adult products (e.g. lingerie, some types of personal hygiene equipment, etc.) often receive a high number of clicks in relation to other types of products, which may give adult products inflated popularity scores. As a result, a search over multiple categories of products may artificially result in listing adult products first. To compensate for this phenomena, a naughty bit may be set for adult products to force these types of products down the quality sort order when these items are returned in a browse result that crosses multiple categories. In some embodiments, a negative naughty bit score is applied to products having the naughty bit set (i.e. adult products). In other embodiments, a positive naughty bit score is applied to those products that do not have the naughty bit set (i.e. non-adult products).

Matching Score

One typical aspect of a shopping vertical search engine is that the same product may be offered by multiple sources. The offers and data from the multiple sources may then be combined for that product. Accordingly, the matching score reflects the precision and quality associated with matching offers and data from multiple sources to a single product.

For a single offer product (i.e. any product that has only one offer matched to it, regardless of the origin of that match), both the product and the offer matched to it get a zero matching score.

For an offer matched to a product with more than one offer matched to it, a variety of different matching scores may be applied to the offer. Offer matching may be done either manually or automatically. Manually matched offers receive a predetermined manual matching score, while automatically matched offers receive a predetermined automatic matching score. Because manual matching is typically more reliable, the manual matching score may be set higher than the automatic matching score.

For a product with multiple offers matched to it, the product's matching score is calculated using the number of offers matched to the product (e.g., on the day that the score is being calculated). Predetermined weighting may be applied to manually and automatically matched offers. As mentioned previously, manually matched offers may be weighted more heavily in the calculation to reflect their higher degree of confidence.

A ranking process similar to that described for the popularity inputs may be used to calculate the matching score because it normalizes relativity between products, and smoothes out the few high product match counts that can disrupt a set. Accordingly, the total number of matched offers (both manually and automatically matched) are determined, as shown in Table 8.

TABLE 8

Number of Matches

| Total Matches (after weighting) | Product ID |
|---|---|
| 8 | A |
| 1 | B |
| 1 | C |
| 0 | D |
| 0 | E |
| 34 | F |
| 24 | G |
| 1 | H |
| 4 | I |
| 2 | J |
| 19 | K |
| 3 | L |
| 1 | M |

The products are then ordered (in ascending order) based on the total number of matches, and each product is assigned a rank, as shown in Table 9. Products with no matches are given a rank of zero.

TABLE 9

Match Rank

| Total Matches | Product ID | Rank |
|---|---|---|
| 0 | D | 0 |
| 0 | E | 0 |
| 1 | C | 1 |
| 1 | M | 2 |
| 1 | B | 3 |
| 1 | H | 3 |
| 2 | J | 4 |
| 3 | L | 5 |
| 4 | I | 6 |
| 8 | A | 7 |
| 19 | K | 8 |
| 24 | G | 9 |
| 34 | F | 10 |

A matching score and weighted matching score are next calculated, according to the following equations and as shown in Table 10. The matching scores are calculated by dividing each product's matching rank by the maximum matching rank. A predetermined weighting may then be applied to the matching scores to calculate weighted matching scores. The matching rank, matching score, and weighted matching score for each product may then be saved in the database.

Matching score=Matching Rank/max(Matching rank)

Weighted Matching Score=Matching Score*Matching Weighting

TABLE 10

Matching Score and Weighted Matching Score

| Total Matches | Product ID | Matching Rank | Matching Score | Weighted Matching Score |
|---|---|---|---|---|
| 0 | D | 0 | 0 | 0 |
| 0 | E | 0 | 0 | 0 |
| 1 | C | 1 | .100 | 80 |
| 1 | M | 2 | .200 | 160 |
| 1 | B | 3 | .300 | 240 |
| 1 | H | 3 | .300 | 240 |
| 2 | J | 4 | .400 | 320 |
| 3 | L | 5 | .500 | 400 |
| 4 | I | 6 | .600 | 480 |
| 8 | A | 7 | .700 | 560 |
| 19 | K | 8 | .800 | 640 |
| 24 | G | 9 | .900 | 720 |
| 34 | F | 10 | 1.000 | 800 |

Attributes Score

The attributes score may take into account the number and quality of product attributes that are available for a given product. In one embodiment, the attributes score may be comprised of two components, a required attributes score and a description length score. For the required attributes score, a number of required attributes may be predetermined for different categories of products. The required attributes score may then be calculated by determining the number of required attributes that the data for a product contains. The description length score is based on the length of the description associated with a product. If a product description is equal to or longer than a predetermined description length threshold, the product receives the full description length score. Alternatively, if a product description is shorter than the predetermined description length threshold, the product may receive either a portion of the description length score or no value. The attributes score may then be calculated by adding the required attributes score and the description length score. In some embodiments, predetermined weighting may be applied to each of the scores.

Classification Score

Figure 6:
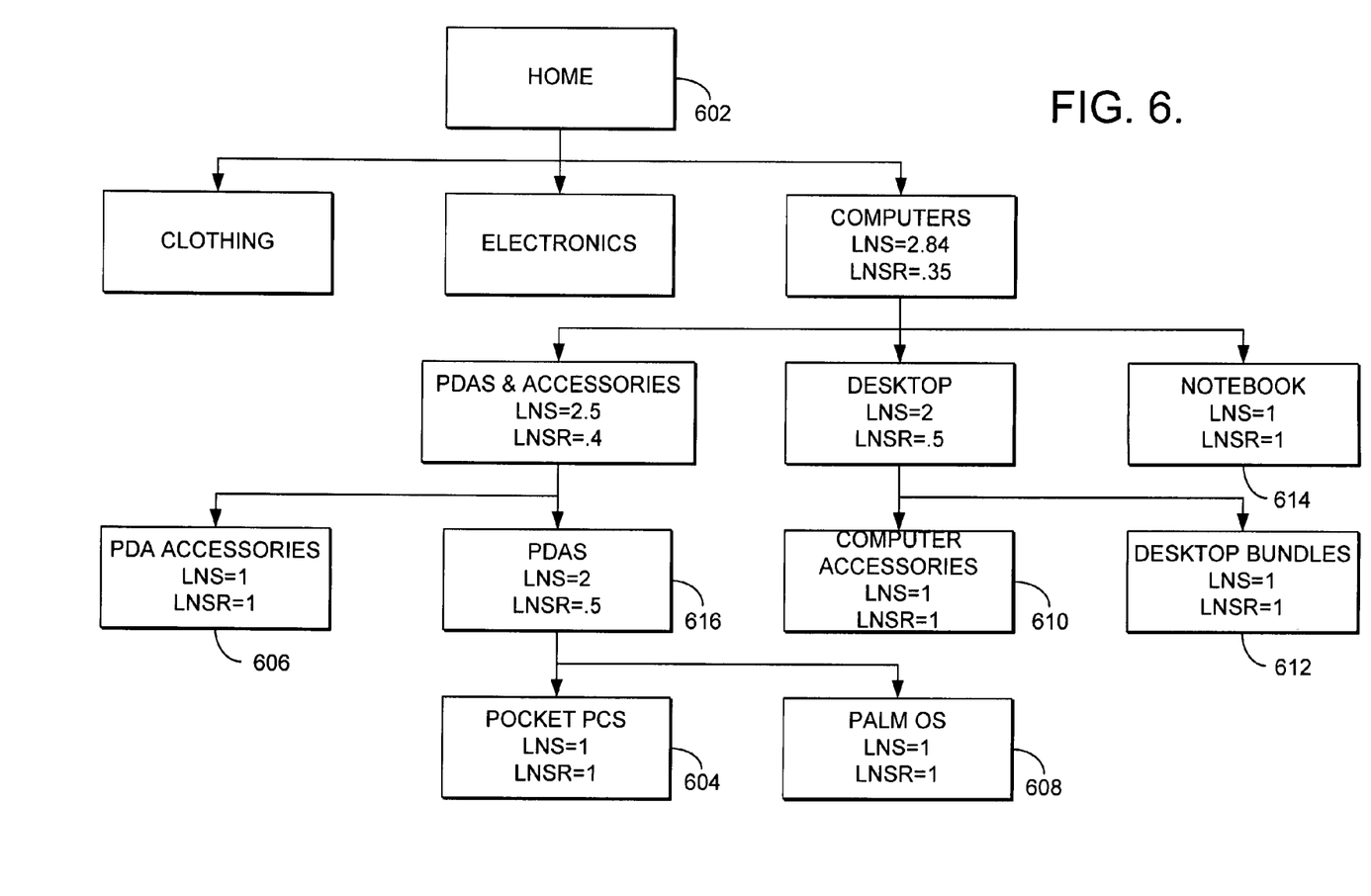
FIG. 6 is a block diagram showing an exemplary classification of products and calculation of classification scores in accordance with an embodiment of the present invention.

Each product may be classified within a particular category of products within the shopping vertical search engine. For example, FIG. 6 illustrates a simplified taxonomy for classifying products with the higher level of abstraction (e.g., Home products 602) shown at the top and the lower level of abstraction (e.g., Pocket PCs 604) shown at the bottom. The classification score is based on how far the category in which a product is classified is from the bottom of the taxonomy. Accordingly, the classification score assumes that the closer the classification is to a leaf node (i.e. a lowest level category), the more precise it is.

The classification score for a product may be determined as follows. Initially, each category is given a leaf node score (LNS). For each category that is a leaf node itself, the category is assigned a LNS of one. For example, referring to FIG. 6, PDA Accessories 606, Pocket PCs 604, Palm OS 608, Computer Accessories 610, Desktop Bundles 612, and Notebooks 614 are each leaf node categories and are assigned a LNS of one. For each category that is not a leaf node, the LNS is the average of the LNSs for the categories immediately beneath it plus one. For example, the LNS for PDAs 616 is the average of the LNS for Pocket PCs 604 and Palm OS 608 plus one. After calculating a LNS for each category, a leaf node score ratio (LNSR) is calculated by inverting the LNS. For example, because the LNS score for PDAs 616 is two, its LNSR is one-half.

In some embodiments, the classification score may also include a classification confidence score, representing the confidence in the classification of a particular product. Accordingly, the classification score may be calculated as follows:

Classification Score=(LNSR*LNSR Weighting) + (Class. Confidence Score*Class. Confidence Weighting)

Data Processing Score

Varying levels of confidence may be associated with the accuracy of data processing for each product, such as the matching of offers to a product and the classification of a product within a category, for example. A data processing score may be provided based on the confidence in data processing (manual and/or automatic) performed for each product. In some embodiments, the data processing score may be an individual input to the global ranking score. In other embodiments, individual source scores may include a sub-component relating to the confidence in data processing for that input, such as described above for the classification score.

Data Source Score

Some data sources are more reliable than other sources. For example, feed sources are typically more reliable than crawl sources. Therefore, a data source score may be applied to each product reflecting the confidence in the data source for the product. Products with data originating from more reliable data sources will have higher data source scores applied. In some embodiments, a default value may be applied initially if information regarding the reliability of a source is not yet available.

Merchant Reputation Score

Similar to a data source score, a merchant reputation score may be applied to each product based on merchant(s) offering the product. Rankings of individual merchants may be used as inputs to generate the merchant reputation score. For example, if a merchant has a reputation for poor quality data, the merchant will receive a low ranking, and products associated with the merchant will receive a reduced merchant reputation score. In contrast, if a merchant has a reputation for accurate and complete data, the merchant will receive a high ranking, and products associated with the merchant will receive a higher merchant reputation score.

CONCLUSION

As can be understood, embodiments of the present invention provide a vertical search engine for ranking items. The vertical search engine may access item data from both feed sources and crawl sources and gather popularity information for each item. Based on the quality of data and popularity of each item, the vertical search engine may calculate a global ranking score for each respective item.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer-readable media storing computer-useable instructions that, when used by a search engine, cause the search engine to perform a computerized method to rank a plurality of items, the method comprising:
   accessing data associated with a plurality of individual search result items from a plurality of data sources, the plurality of data sources including at least one feed source and at least one crawl source, wherein the at least one feed source comprises a third-party source of information external to the search engine that feeds data to the search engine, and wherein the at least one crawl source comprises a third-party source of information external to the search engine that is crawled by the search engine to access data;
   determining at least one popularity input for each of the plurality of individual search result items, wherein the at least one popularity input for a given individual search result item is indicative of a user popularity of that given individual search result item;
   determining at least one data quality input for each of the plurality of individual search result items, wherein the at least one data quality input for a given individual search result item is indicative of at least one of a completeness, accuracy, and reliability of data available for the given individual search result item; and
   calculating a global ranking score for each of the plurality of individual search result items based on the at least one popularity input and the at least one data quality input for each of the plurality of individual search result items, wherein the global ranking scores allow the plurality of individual search result items to be ranked against each other and commingled together in a common list as search results in response to a search query submitted to the search engine.

2. The one or more computer-readable media of claim 1, wherein accessing data associated with a plurality of individual search result items comprises:
   accessing at least one data feed from at least one feed source, the at least one data feed containing data associated with at least one individual search result item; and
   crawling at least one crawl source to access data associated with at least one individual search result item.

3. The one or more computer-readable media of claim 2, further comprising:
   storing the data from the at least one feed source and the data from the at least one crawl source in a database.

4. The one or more computer-readable media of claim 3, wherein accessing data associated with a plurality of items further comprises:
   accessing the data stored in the database.

5. The one or more computer-readable media of claim 1, wherein determining at least one popularity input for each of the plurality of individual search result items comprises:
   gathering popularity information for each of the plurality of individual search result items; and
   determining the at least one popularity input based on the popularity information gathered for each of the plurality of individual search result items.

6. The one or more computer-readable media of claim 5, wherein the popularity information for each of the plurality of items comprises at least one of user clicks on an item, ratings of an item, reviews of an item, and rated helpfulness of reviews of an item.

7. The one or more computer-readable media of claim 1, wherein in the at least one popularity input comprises at least one of a click score, a trend score, and a ratings and reviews score.

8. The one or more computer-readable media of claim 1, wherein the at least one data quality input for at least one individual search result item comprises at least one of the following: an image score based on at least a presence or absence of an image for the at least one individual search result item, a naughty bit score based on whether the at least one individual search result item is categorized as an adult product, a matching score based on a number of different data sources providing data matching the at least one individual search result item, an attributes score based on a number and quality of attributes available for the at least one individual search result item, a classification score based on how far a category in which the at least one individual search result item is classified is from a bottom of a classification taxonomy, a data processing score based on a confidence in data processing performed for the at least one search result item, a data source score based on a confidence in the data source for the at least one individual search result item, and a merchant reputation score based on a confidence in the data source for the at least one individual search result item.

9. The one or more computer-readable media of claim 1, wherein calculating a global ranking score for each of the plurality of individual search result items comprises applying a weighting to each of the at least one popularity input and at least one data quality input for each of the plurality of individual search result items.

10. One or more computer-storage media embodying computer useable instructions for causing a search engine to perform a method for providing search results based on a search query from a client device, the method comprising:
   receiving the search query from the client device;
   determining a subset of a plurality of items based on the search query, wherein the subset of the plurality of items includes at least one item from at least one feed source and at least one item from at least one crawl source, wherein the at least one feed source comprises a third-party source of information external to the search engine that feeds data to the search engine and the at least one crawl source comprises a third-party source of information external to the search engine that is crawled by the search engine to access data, and wherein each of the plurality of items includes a global ranking score that is based on at least one popularity input indicative of user interest in the item and at least one data quality input indicative of a quality of data available for the item, wherein the at least one data quality input includes at least an attributes score calculated at least in part on a number of predetermined attributes available for the item; and providing the subset of the plurality of items to the client device, the items within the subset being ordered within a common list based at least in part on the global ranking score associated with each item of the subset such that the at least one item from the at least one feed source and the at least one item from the at least one crawl source are ranked against one another and commingled in the common list provided to the client device.

11. The one or more computer-storage media of claim 10, wherein determining a subset of a plurality of items based on the search query comprises accessing a database containing data associated with each of the plurality of items and determining the subset based on the search query and the data associated with each of the plurality of items.

12. A search engine device for ranking items, the search engine device having a processor and comprising:
   a data accessing component for accessing data associated with a plurality of individual items from a plurality of sources, the plurality of sources including at least one feed source and at least one crawl source;
   a ranking component for calculating a global ranking score for each of the plurality of individual items, wherein the global ranking score is calculated based on at least one data quality input and at least one popularity input for each of the plurality of individual items, wherein the at least one data quality input for each individual item is indicative of a quality of data available for each individual item and the at least one popularity input is indicative of user interest in each individual item; and
   a search query component for receiving a search query from a client device and providing search results to the client device based on the search query, wherein the search results comprise a subset of the plurality of individual items including at least one individual item based on data from the at least one feed source and at least one individual item based on data from the at least one crawl source, and wherein the plurality of individual items are ordered against one another and commingled in a common list based at least in part on the global ranking score of each individual item within the subset.

13. The search engine device of claim 12, wherein the data accessing component comprises:
   a data feed component for accessing at least one data feed from at least one feed source external to the search engine device; and
   a crawl component for accessing data by crawling at least one crawl source external to the search engine device.

14. The search engine device of claim 12, wherein the ranking component comprises at least one of:
   a data quality determining component for determining the at least one data quality input for each of the plurality of individual items; and
   a popularity determining component for gathering popularity data and determining the at least one popularity input for each of the plurality of individual items.

15. The search engine device of claim 14, further comprising:
   a database for storing item data and popularity data for each of the plurality of individual items.

16. The one or more computer-storage media of claim 10, wherein the at least one popularity input for an item comprises a click score based on the number of clicks the item has received, a trend score based on a trend in clicks the item is receiving, and a ratings and reviews score based on user ratings and reviews of the item.

17. The one or more computer-storage media of claim 10, wherein the at least one data quality input for an item comprises an image score based on at least a presence or absence of an image for the item, a naughty bit score based on whether the item is categorized as an adult product, a matching score based on a number of different data sources providing data matching the item, a classification score based on the classification for the item, a data processing score based on a confidence in data processing performed for the item, a data source score based on a confidence in the data source for the item, and a merchant reputation score based on a reputation of a merchant providing the item.

* * * * *

UNITED STATES PATENT AND TRADEMARK OFFICE
CERTIFICATE OF CORRECTION

| | | |
|---|---|---|
| PATENT NO. | : 7,693,901 B2 | Page 1 of 1 |
| APPLICATION NO. | : 11/200615 | |
| DATED | : April 6, 2010 | |
| INVENTOR(S) | : Chong I. Ka et al. | |

It is certified that error appears in the above-identified patent and that said Letters Patent is hereby corrected as shown below:

In column 4, line 58, delete "storge" and insert -- storage --, therefor.

In column 13, line 10, after "click score," insert -- a --.

Signed and Sealed this
Twenty-fourth Day of May, 2011

David J. Kappos
*Director of the United States Patent and Trademark Office*